United States Patent [19]
Addis et al.

[11] 3,739,460
[45] June 19, 1973

[54] METHOD OF JOINING CONCENTRIC MEMBERS

[75] Inventors: Gilbert I. Addis, Plainfield; George M. Fairbanks, Piscataway, both of N.J.

[73] Assignee: Thomas & Betts Corporation, Elizabeth, N.J.

[22] Filed: June 1, 1971

[21] Appl. No.: 148,707

[52] U.S. Cl. .................. 29/516, 29/523, 138/148, 285/97, 285/382.4
[51] Int. Cl. ....................... B21d 39/00, B23p 11/00
[58] Field of Search .................... 29/516, 523, 506, 29/507, 508; 285/97, 382.4; 251/5; 138/148

[56] References Cited
UNITED STATES PATENTS

| | | | |
|---|---|---|---|
| 1,218,895 | 3/1917 | Porter | 138/148 |
| 3,023,995 | 3/1962 | Hopkins | 251/5 |
| 3,073,627 | 1/1963 | Ritter | 285/382.4 X |
| 3,126,568 | 3/1964 | Wubbe | 29/523 UX |
| 3,137,066 | 6/1964 | Merino et al. | 29/523 UX |
| 3,239,931 | 3/1966 | Guarnaschelli | 285/55 X |

*Primary Examiner*—Charlie T. Moon
*Attorney*—David Teschner and Jesse Woldman

[57] ABSTRACT

A concentric member assembly and an improved method of fabrication thereof including inserting a hollow, externally conically tapered, preferably shouldered wedge means into each end of a preferably metallic, permanently deformable inner elongate tubular member generally centrally aligned within an elongate, preferably metallic tubular outer member to selectively expand the inner member ends into intimate contacting engagement with adjacent internally cinically tapered portions of the outer member inner surface. The wedge means may be suitably arranged either for removal from the inner member after use, or, alternatively, for retention therewithin to provide additional support therefore. The outer member may be inwardly deformed adjacent each of its ends to engage either the adjacent inner member end or the wedge means retained therewithin. The resulting structure may be advantageously employed as a multiple sleeve connecting device or the like.

13 Claims, 13 Drawing Figures

PATENTED JUN 19 1973 3,739,460

INVENTORS
GILBERT I. ADDIS
GEORGE M. FAIRBANKS
BY
Jesse Woldman
AGENT

METHOD OF JOINING CONCENTRIC MEMBERS

BACKGROUND OF THE INVENTION

1. Field of the Invention

The invention is directed to the field of multi-tubular devices and an improved method of fabrication therefor.

2. Description of the Prior Art

Methods for joining concentric members, as, for example, the inner and outer tubular members of dual-sleeve metallic splicers or the like, according to the prior art, generally comprised, in one form, disposing either a separate cap or ring adjacent each of the open ends of the assembly in an attempt to provide an adequate seal between the members, where, for example, a fluid or explosive charge is to be introduced between the members for deforming the inner member about one or more conductors disposed therewithin. In practice, such methods were generally expensive, time consuming and often ineffective, requiring extremely close tolerance mating parts which were readily subject to damage and misalignment. Efforts to overcome the above limitations, such as welding or otherwise bonding together the adjacently disposed free ends of the inner and outer members, were also often unsuccessful in that the resulting engagement was generally inadequate to provide a sufficient seal against the relatively high pressures generated between the members for proper deformation of the inner member.

SUMMARY OF THE INVENTION

The invention overcomes the problem and limitations noted above with respect to such prior art methods by providing an improved method for joining concentric members which is more efficient, positive, rapid and convenient than such methods. An elongate tubular, permanently deformable, preferably metallic inner member is generally centrally aligned within an outer elongate preferably metallic tubular member the inner surface of which comprises a selectively tapered portion generally adjacent each of its ends. An externally conically tapered, preferably cylindrical, wedge having preferably a reduced diameter shoulder portion adjacent its larger end is inserted into each end of the inner member to radially expand said ends into intimate engagement with the adjacent tapered portions of the outer member inner surface. Upon completion of the expansion operation, the wedges may be either removed, or retained within the respective ends of the inner member, and that portion of the outer member generally adjacent its ends deformed or otherwise displaced inwardly by, for example, rolling, impacting, knurling or other suitable methods adopted to cause further engagement between the adjacent ends of the outer and inner members, and, consequently, between each outer member end and the reduced diameter portion of an associated wedge means, where appropriate, to further advantageously lock each wedge means within the inner member ends. Although the disclosed method may be readily employed to securely join any two suitably formed, concentrically aligned members, it may be advantageously employed to fabricate an improved dual-sleeve splicing device by desirably providing an economical and highly effective mechanical bond between the inner and outer sleeves thereof. Where the inner sleeve of such device is particularly adapted for compressive deformation upon the application of a pressurized fluid, explosive charge, or the like within a selective space between the sleeves, the resulting seal established by the instant method insures proper confinement of the pressurized material within the desired area, such device generally comprising a relatively soft inner sleeve which may be formed of an electrically conducting material such as soft temper copper, aluminum, brass or the suitable alloys thereof, and a somewhat more rigid outer sleeve which may be formed from a material similar to that employed in the inner sleeve. Thus, the ends of the inner sleeve may be readily expanded and urged into desirably permanent close conforming contact with the adjacent tapered portions of the inner surface of the outer sleeve upon the forceable insertion of the suitably contoured conically tapered wedge means therewithin. It is therefore an object of this invention to provide an improved concentric member assembly and method of fabrication.

It is another object of this invention to provide an improved method for establishing intimate engagement between the associated adjacent ends of a pair of concentric tubular members.

It is a further object of theis invention to provide a method for employing conically tapered wedge means to establish intimate engagement between the associated adjacent ends of a pair of concentric tubular members.

It is still another object of this invention to provide an improved method for establishing an interspacial seal between concentric tubular members.

It is still a further object of this invention to provide an improved method for forming a multiple sleeve connector.

It is yet another object of this invention to provide an improved method for effectively utilizing a generally conically tapered wedge means for establishing an effective interspacial seal between the associated ends of an outer and inner sleeve of a multiple sleeve connector.

It is yet a further object of this invention to provide an improved method for radially expanding the ends of the inner of a pair of concentrically disposed tubular sleeves into intimate contacting engagement with the suitably tapered adjacent portions of the inner surface of the outer sleeve. It is yet another object of this invention to provide an improved multiple sleeve connector.

It is still a further object of the invention to provide an improved multiple sleeve connector having an inner sleeve arranged for deformable engagement about one or more articles disposed therewithin.

It is yet a further object of this invention to provide an improved multiple sleeve connector having a securely sealed fluid receiving interspace therebetween.

It is yet another object of this invention to provide an improved method for effectively utilizing a generally conically tapered wedge means for radially expanding and supporting the ends of the inner sleeve of a multiple sleeve connector.

Other objects and features of the invention will be pointed out in the following description and claims and illustrated in the accompanying drawings, which disclose, by way of example, the principle of the invention and the best mode contemplated for carrying it out.

BRIEF DESCRIPTION OF THE DRAWINGS

In the Drawings.

Similar elements are given similar reference characters in each of the respective drawings.

Figure 1:
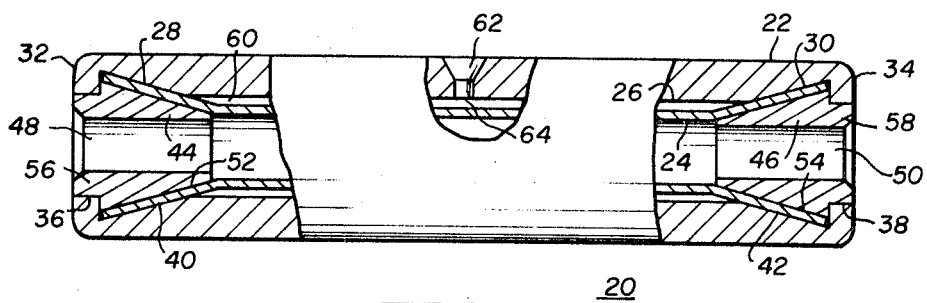
FIG. 1 is a side elevational view, partly in section of joined concentric members constructed in accordance with the concepts of the invention.
Figure 13:
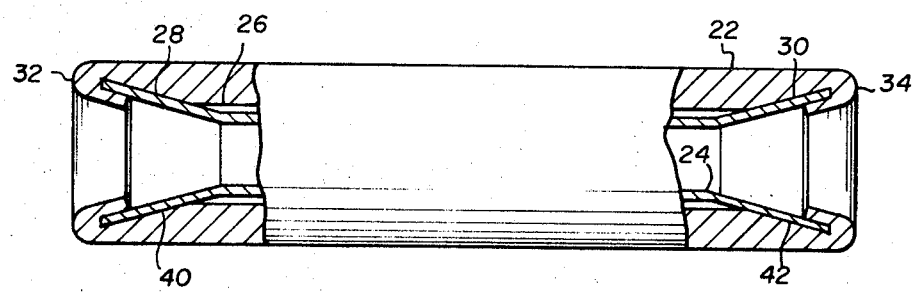
FIG. 13 is a side elevational view, partly in section, of another embodiment of joined concentric members according to the concepts of the invention.

DESCRIPTION OF THE PREFERRED EMBODIMENTS:

Turning now to FIG. 1, there is shown a completed assembly of joined concentric members 20 constructed in accordance with the concepts of the invention. Disposed substantially medially within a generally elongate tubular preferably rigid outer member 22 formed preferably of metallic material is a generally elongated tubular inner member 24 also formed preferably of a metallic but readily permanently deformable material. The inner surface 26 of outer member 22 has a selectively tapered portion 28, 30 generally adjacent each of its ends 32, 34, respectively, terminating preferably in an inwardly directed shoulder 36, 38. Each of the ends 40, 42 of inner member 24 is expanded generally radially outwardly into contacting engagement with an associated adjacent tapered portion 28, 30 of outer member 22 by the insertion thereinto of wedge means such as members 44, 46, respectively, each having a generally longitudinal passage 48, 50 therethrough and a suitably contoured tapered exterior surface 52, 54 arranged preferably complementary to the selectively tapered portions 28, 30, respectively of the inner surface 26 of outer member 22 for expanding the ends 40 and 42 of inner member 24 into tight mating engagement with tapered portions 28, 30. The form of the tapered exterior surface 52, 54 of members 44, 46, respectively, will be governed principally by the contour of the opposing interior tapered portions 28, 30 of outer member 22, and, although shown as generally conical, may be suitably formed in one of a variety of other appropriate shapes arranged to effect the desired selective expansion of the ends 40, 42 of inner member 24 in close conforming relationship with the outer member tapered portions 38, 30. For example, where the inner surface 26 of outer member 22 defines a substantially hexagonal, rectangular, square, or other commonly employed section, the tapered exterior surfaces 52, 54 of wedge members 44, 46, respectively, may be similarly formed to provide the necessary conforming expansion of the inner member ends 40, 42. Each of the wedge members 44, 46 may be further provided with a shoulder portion 56, 58, respectively, adjacent its larger end for engagement with the associated adjacent ends 32, 34, of outer member 22, thereby further insuring the retention of members 44, 46 within the inner member 24, where necessary or desirable. Thus, the inner member 24 may be rapidly, conveniently, and securely joined to the outer member 22 while simultaneously providing an effective seal between the respective ends thereof. For example, as may be seen in FIG. 1, the inner and outer members 24, 22 respectively, of device 20 may be suitably proportioned to provide a generally longitudinally extending gap 60 therebetween arranged to receive, for example, a quantity of pressurized material supplied thereto through an orifice 62 extending generally transversely through the outer member 22 and communicating with gap 60 at an opening 64. Such device may be effectively employed as a multiple sleeve connector wherein the inner member 24 may be readily deformed inwardly upon the application of suitable pressure within the gap 60 to seize and securely retain one or more conductors or the like appropriately disposed within said sleeve 24, and particularly where the integrity of the seal between the inner and outer members 24, 22, respectively, must be adequately maintained to permit sufficient pressure to be applied within the gap 60 for effective deformation of the inner member 24. It will be readily apparent to those skilled in the art that the wedge members 44, 46, although providing a means for both deforming the associated ends 40, 42 of inner member 24 and furnishing further support therefor, may be subsequently removed after the deforming operation, to provide an assembly substantially as shown in FIG. 13. The ends 32, 34 of outer member 22 are deformed inwardly about the adjacent ends 40, 42, respectively of inner member 24, thereby maintaining said ends 40, 42 in close engaging relationship with the adjacent tapered portions 28, 30 of the outer member inner surface 26 and establishing a secure joint between said members 22 and 24.

Figure 2:
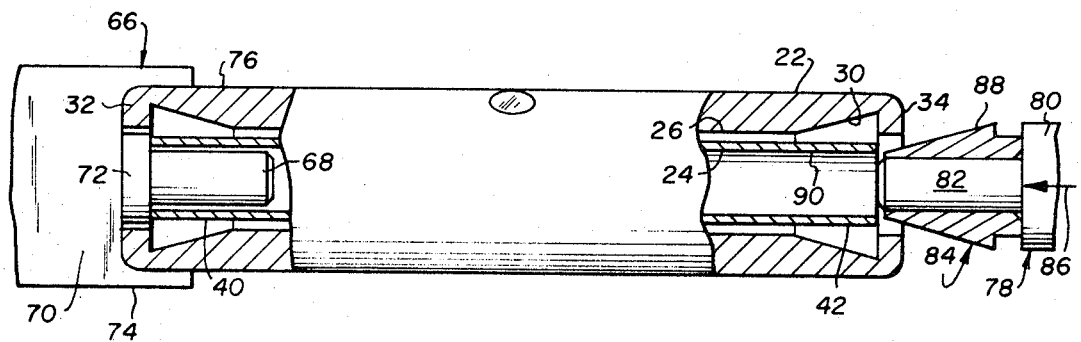
FIG. 2 is a side elevational view, partly in section, of the device of FIG. 1 showing a step in the fabrication thereof.
Figure 3:
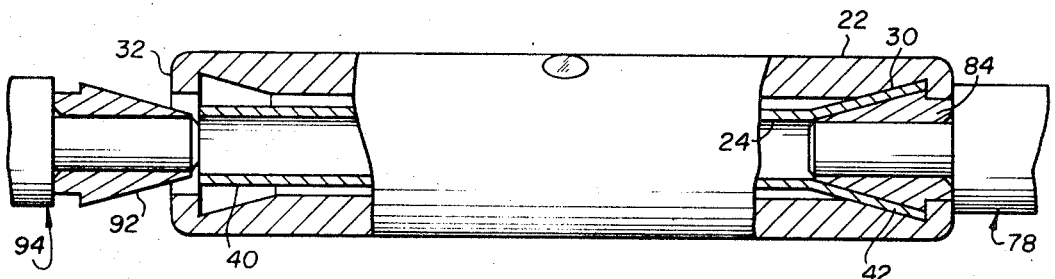
FIG. 3 is a side elevational view, partly in section, of the device of FIG. 1, showing another step in the fabrication thereof.
Figure 4:
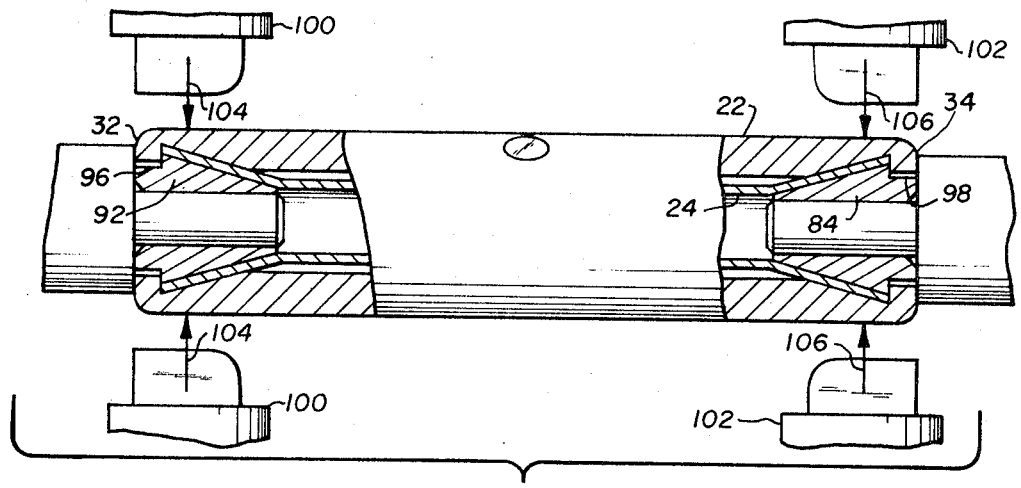
FIG. 4 is a side elevational view, partly in section, of the device of FIG. 1, showing a further step in the fabrication thereof.
Figure 5:
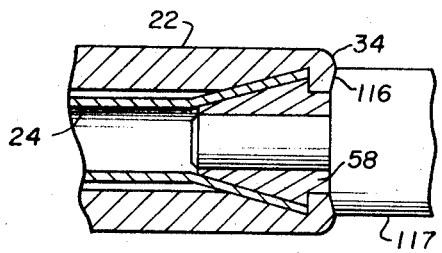
FIG. 5 is a fragmentary side elevational view, in section, of a portion of joined concentric connectors showing another structure for carrying out a step in the fabrication thereof according to the concepts of the invention.
Figure 6:
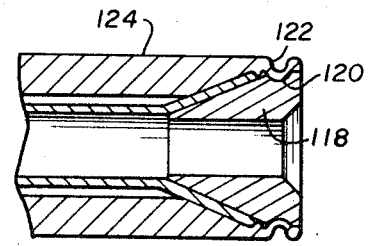
FIG. 6 is a fragmentary side elevational view, in section, of a portion of joined concentric members, showing a modification of the device of FIG. 1 according to the concepts of the invention.
Figure 7:
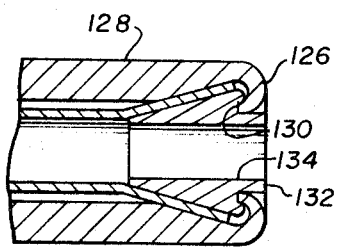
FIG. 7 is a fragmentary side elevational view, in section, of a portion of joined concentric members, showing still another modification of the device of FIG. 1 according to the concepts of the invention.
Figure 8:
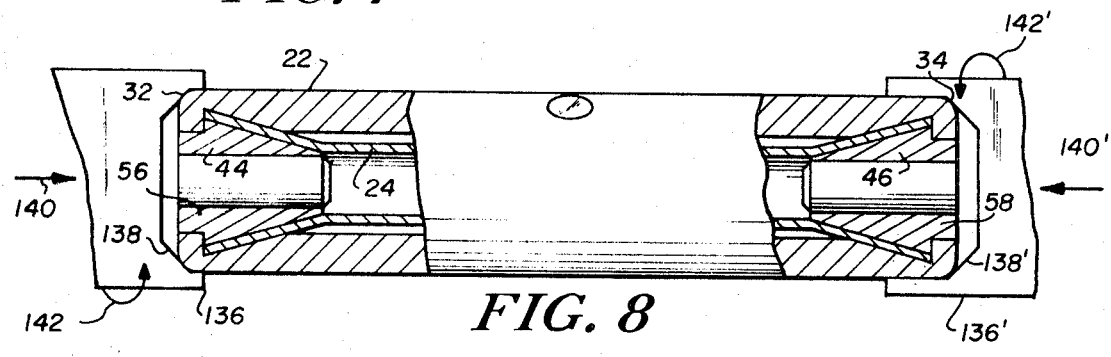
FIG. 8 is a side elevational view, partly in section, of the device of FIG. 1 showing an alternative step in the fabrication thereof.
Figure 9:
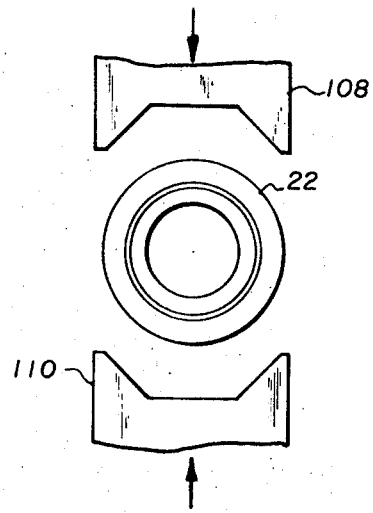
FIG. 9 is a front elevational view showing a further alternative step in the fabrication of joined concentric members.
Figure 10:
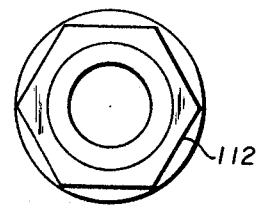
FIG. 10 is a front elevational view of an end of joined concentric members as formed by the step shown in FIG. 9.
Figure 11:
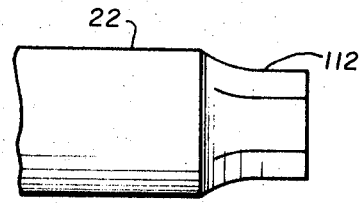
FIG. 11 is a fragmentary side elevational view of an end of joined concentric members constructed in accordance with another embodiment of the invention.
Figure 12:
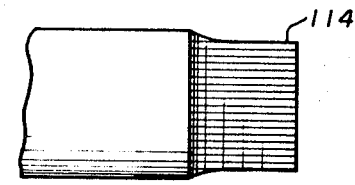
FIG. 12 is a fragmentary side elevational view of an end of joined concentric members constructed in accordance with yet another embodiment of the invention.

Turning now to FIGS. 2 through 5, and FIGS. 8 and 9, there are shown a series of steps, which may be employed in a method of joining concentric members according to concepts of the invention. For purposes of simplicity and convenience, and by way of example, the following steps will be described as directed principally to forming the assembly comprising device 20 of FIG. 1, although it will be readily apparent that such method may be advantageously employed to join a variety of other generally concentrically aligned tubular members in similar fashion. In FIG. 2 the inner member 24 is shown positioned generally medially within the outer member 22 and maintained in substantially aligned relationship therewith by a stepped first mandrel 66 having a first generally centrally disposed extending portion 68 proportioned to fit closely within the end 40 of inner sleeve 24. Interposed between the body portion 70 and extending portion 68 of mandrel 66 is an enlarged portion 72 suitably arranged to provide a support for inner member 24 in selective relation with respect to outer member 22. A skirt 74 extends from mandrel 66 generally circumferentially about its extending portion 68 and is dimensionally proportioned to fit about the adjacent outer surface 76 of outer member 22 thus providing additional alignment and support where necessary or desirable. Disposed adjacent the other ends 34, 42, respectively, of outer and inner members 22, 24 is a second mandrel 78 comprising a generally centrally disposed extending portion 82 coupled to a body portion 80 and proportioned to receive thereon a tapered wedge means such as member 84 essentially similar to members 44, 46 of device 20. Upon the advance of mandrel 80 into the open end 42 of inner member 24, as directionally indicated by arrow 86, at the right in FIG. 2, the selectively proportioned tapered exterior surface 88 of wedge 84 is caused to bear against the adjacent inner surface 90 of inner member 24 and radially expand the end 42 thereof into contacting engagement with the adjacent tapered portion 30 of the outer member inner surface 26, as may be more clearly seen at the right in FIG. 3. Mandrel 66 may now be removed and the other end 40 of inner member 24 expanded outwardly by inserting a further wedge 92 into said end 40 in a manner similar to that described above with respect to wedge 84. At the left of FIG. 3 wedge 92 is shown appropriately disposed on mandrel 94, essentially duplicative of mandrel 78, for advancement into end 40 of inner member 24. Although shown as essentially a sequential operation, the insertion of wedges 84 and 92 into the respective ends 42 and 40 of inner member 24 may be performed simultaneously simply by first manually or otherwise establishing an aligned relationship between the inner and outer members 24 and 22, respectively, and then simultaneously advancing mandrels 78 and 94 into the respective ends 40 and 42 of inner member 24. The assembly may now be subjected to a further operation, one embodiment of which is shown in FIG. 4, to inwardly deform or otherwise displace the ends 32 and 34 of the outer member 22, for example, into engagement with the adjacent shoulder portions 96, 98 of wedge members 92, 84, respectively. In FIG. 4 each of the die sets 100 and 102 are shown disposed in generally opposing relationship adjacent each of the respective ends 32 and 34 of outer member 22, and arranged for advancement towards member 22 as directionally indicated by arrows 104, 106, for compressively deforming said ends inwardly towards the shoulder portions 96, 98 of wdge members 92 and 84, respectively. The die sets 100, 102 may be suitably shaped, as shown for example, in FIG. 9, wherein first and second die members 108 and 110 are appropriately recessed to compressively impart a substantially hexagonal shape, such as indicated at 112 in FIGS. 10 and 11, to the outer member 22 generally adjacent each of its respective ends 32, 34. It will readily be apparent to those skilled in the art that other suitable configurations may be similarly employed to effect the desired deformation, and may include, for example, octagonal, round, oval, elliptical, or square configurations, where necessary, desirable, or convenient. Die sets 100 and 102 may also be conveniently employed either as impacting or compression means, either method being equally as effective to accomplish the desired deformation. Die sets such as 100, 102 may be suitably contoured to effect a knurl-like deformation of the respective ends 32, 34 of the outer sleeve 22, as exemplified in FIG. 12 at 114, such deformation being obtained by, for example, rolling each selectively contoured die member about the periphery of sleeve 22 adjacent the respective ends thereof. Where desirable, either or both of the mandrels 78 and 94 (FIG. 3) may be modified as indicated at 116 in FIG. 5 wherein a mandrel 117 is suitably altered to provide a partially tapered ring-like portion for engageable contact with an associated end 32, 34 of sleeve 22 to generally longitudinally inwardly deform said end 34 into locking contact with an associated wedge means shoulder 58. Other readily employed arrangements for appropriately interlocking an outer sleeve to an associated wedge means are shown in FIGS. 6, 7 and 8. In FIG. 8, wedge means 118 is provided with a generally circumferentially disposed recess 120 into which a portion 122 of an outer sleeve 124 may be deformed, and which may include a plurality of such recesses 120 in generally spaced, circumventing relationship, where necessary or desirable. Alternatively, as may be more clearly seen in FIG. 7, the end 126 of an outer sleeve 128 may be rolled or otherwise displaced into one or more suitably arranged recesses such as 130 disposed generally circumferentially within the enlarged end 132 of wedge emeans 134. A further alternative means for inwardly deforming the ends 32, 34 into engagement with the associated shoulder portions 56, 58 of wedge means 44, 46, as shown in FIG. 8, comprises longitudinally advancing an appropriately recessed member 136, 136' having an at least partially obliquely angled inner surface 138, 138' against the associated adjacent end 32, 34 of the outer sleeve 22, directionally as indicated by the arrows 140, 140', at the left and right, respectively, of FIG. 8. Members 136, 136' may be simultaneously rotated generally directionally as indicated by the arrows 142, 142', where necessary or desirable to further shape the deformed ends 32, 34 during, or subsequent to the deforming operation. Members 136, 136' may be selectively advanced towards each of the respective ends 32, 34 of outer sleeve 22 at such speed as to effect the deformation of said ends either by subjecting them to a relatively slow compressive force, or fairly rapid impacting force, the choice and consequential advantages of each method being readily apparent to those skilled in the art, either method affording a rapid, convenient, and inexpensive means for accomplishing the desired deformation. It will be further readily apparent that the devices ices heretofore described for accomplishing the various steps in the method of the instant invention are not necessarily mutually exclusive, and may be advantageously combined to effect to the desired assembly. For example, the ends 32, 34 of the outer sleeve 22 may be simultaneously or sequentially longitudinally, and radially deformed by employing a mandrel such as 117 (FIG. 5) in combination with die sets 100, 102 (FIG. 4), the above described combination being illustrative only, and in no way exhaustive of the of the variety of combination inherent within the concepts disclosed herein.

The embodiments of the invention in which an exclusive property or privilege is claimed are defined as follows:

We claim:

1. A method of joining concentric members comprising the steps of: aligning an inner generally elongate tubular deformable member having a first given length and first and second ends, generally centrally within an outer generally elongate tubular member having third and fourth ends and a second given length dimensionally greater than said first given length; radially expanding each of said first and second ends of said inner member into contacting engagement with an associated selectively tapered portion of the inner surface of said outer member generally adjacent said inner member first and second ends; and at least partially inwardly deforming said outer member generally adjacent each of said third and fourth ends thereof for intimate engagement with said inner member generally adjacent an associated one of said first and second ends thereof.

2. A method of joining concentric members comprising the steps of: aligning an inner generally elongate tubular deformable member having a first given length and first and second ends, generally centrally within an outer generally elongate tubular member having third and fourth ends and a second given length dimensionally greater than said first given length; radially expanding said first and second ends of said inner member into contacting engagement with a selectively tapered portion of the inner surface of said outer member generally adjacent said outer member third and fourth ends by forcibly urging wedge means having a conically tapered exterior surface into each of said first and second ends of said inner member; retracting said wedge means from each of said inner member first and second ends; and at least partially inwardly deforming said outer member generally adjacent each of said third and fourth ends thereof for intimate engagement with said inner member generally adjacent an associated one of said first and second ends thereof.

3. A method of joining concentric members as defined in claim 2 wherein said outer member is at least partially inwardly deformed by selectively impacting the outer surface thereof generally adjacent each of said third and fourth ends of said outer member.

4. A method of joining concentric members as defined in claim 2 wherein said outer member is at least partially inwardly deformed by subjecting the outer surface thereof to a generally radially directed compressive force generally adjacent each of said third and fourth ends of said outer member.

5. A method of joining concentric members as defined in claim 2 wherein said outer member is at least partially inwardly deformed by rolling each of said third and fourth ends thereof at least partially about an associated one of said inner member first and second ends.

6. A method of joining concentric members as defined in claim 2 wherein said outer member is at least partially inwardly deformed by subjecting the outer surface thereof to an at least partially radial, partially longitudinal, compressive force generally adjacent each of said third and fourth ends of said outer member.

7. A method of joining concentric members comprising the steps of: aligning an inner generally elongate tubular deformable member having a first given length and first and second ends, generally centrally within an outer generally elongate tubular member having third and fourth ends, a second given length dimensionally greater than said first given length, and an inner surface having a selectively tapered portion generally adjacent each of said third and fourth ends; inserting wedge means having a conically tapered exterior surface and a reduced diameter shoulder portion adjacent the larger end of said wedge means into each of said first and second ends of said inner member to radially expand each of said first and second ends into contacting engagement with an associated one of said outer member inner surface selectively tapered portions; and urging each of said outer member third and fourth ends into engagement with said shoulder portion of an associated wedge means.

8. A method of joining concentric members comprising the steps of: aligning an inner generally elongate tubular deformable member having a first given length and first and second ends, generally centrally within an outer generally elongate tubular member having third and fourth ends, a second given length dimensionally greater than said first given length, and an inner surface having a selectively tapered portion generally adjacent each of said third and fourth ends; inserting wedge means having a conically tapered exterior surface and a reduced diameter shoulder portion adjacent the larger end of said wedge means into each of said first and second ends of said inner member to radially expand each of said first and second ends into contacting engagement with an associated one of said outer member inner surface selectively tapered portions; and selectively compressing said outer member generally adjacent said third and fourth ends thereof, and urging each of said outer member third and fourth ends into engagement with said shoulder portion of an associated wedge means.

9. A method of forming a multiple sleeve connector comprising the step of: aligning a metallic generally elongate inner tubular deformable member having a first given length and first and second ends, generally centrally within a metallic generally elongate outer tubular member having third and fourth ends, a second given length dimensionally greater than said first given length, and an inner surface having a selectively tapered portion adjacent each of said third and fourth ends; inserting wedge means having a conically tapered exterior surface and a reduced diameter shoulder portion adjacent the larger end of said wedge means into each of said first and second ends of said inner member to radially expand each of said first and second ends into contacting engagement with an associated one of said outer member inner surface selectively tapered portions; and urging each of said outer member third and fourth ends into engagement with said shoulder portion of an associated wedge means.

10. A method of forming a multiple sleeve connector comprising the steps of: aligning a metallic generally elongate inner tubular deformable member having a first given length and first and second ends, generally centrally within a metallic generally elongate outer tubular member having third and fourth ends, a second given length dimensionally greater than said first given length, and an inner surface having a selectively tapered portion adjacent each of said third and fourth ends; inserting wedge means having a conically tapered exterior surface and a reduced diameter shoulder portion adjacent the larger end of said wedge means into each of said first and second ends of said inner member to radially expand each of said first and second ends into contacting engagement with an associated one of said outer member inner surface selectively tapered portions; rolling each of said outer tubular member third and fourth ends into engagement with said shoulder portion of an associated one of said wedge means to form a bond therebetween.

11. A method of forming a multiple sleeve connector comprising the steps of: aligning a metallic generally elongate inner tubular deformable member having a first given length and first and second ends, generally centrally within a metallic generally elongate outer tubular member having third and fourth ends, a second given length dimensionally greater than said first given length, and an inner surface having a selectively tapered portion adjacent each of said third and fourth ends; inserting wedge means having a conically tapered exterior surface and a reduced diameter shoulder portion adjacent the larger end of said wedge means into each of said first and second ends of said inner member to radially expand each of said first and second ends into contacting engagement with an associated one of said outer member inner surface selectively tapered portions; rolling each of said outer tubular member third and fourth ends into engagement with an associated one of said inner member first and second ends to form a bond therebetween.

12. A method of joining concentric members comprising the steps of: aligning an inner generally elongate tubular deformable member having a first given length and first second ends, generally centrally within an outer generally elongate tubular member having third and fourth ends and a second given length dimensionally greater than said first given length; radially expanding said first and second ends of said inner member into contacting engagement with a selectively tapered portion of the inner surface of said outer member generally adjacent said outer member third and fourth ends by forcibly urging wedge means having a conically tapered exterior surface into each of said first and second ends of said inner member; retracting said wedge means from each of said inner member first and second ends; and at least partially inwardly rolling said outer member generally adjacent each of said third and fourth ends thereof to form a bond with said inner member generally adjacent an associated one of said first and second ends thereof.

13. A method of joining concentric members comprising the steps of: aligning an inner generally elongate tubular deformable member having a first given length and first and second ends, generally centrally within an outer generally elongate tubular member having third and fourth ends and a second given length dimensionally greater than said first given length; radially expanding said first and second ends of said inner member into contacting engagement with a selectively tapered portion of the inner surface of said outer member generally adjacent said outer member third and fourth ends by forcibly urging wedge means having a conically tapered exterior surface into each of said first and second ends of said inner member; retracting said wedge means from each of said inner member first and second ends; and urging said outer member generally adjacent each of said third and fourth ends against a rapidly rotating generally planar surface to form a bond with said inner member generally adjacent an associated one of said first and second ends thereof.

* * * * *